Aug. 21, 1956  A. N. NAWROCKI  2,759,308
APPARATUS FOR PRODUCING INDIVIDUALLY WRAPPED CHEESE SLABS
Filed Oct. 5, 1953  2 Sheets-Sheet 1

INVENTOR.
ARNOLD NORMAN NAWROCKI
BY Joshua R. H. Potts
HIS ATTORNEY.

Aug. 21, 1956   A. N. NAWROCKI   2,759,308
APPARATUS FOR PRODUCING INDIVIDUALLY WRAPPED CHEESE SLABS
Filed Oct. 5, 1953   2 Sheets-Sheet 2
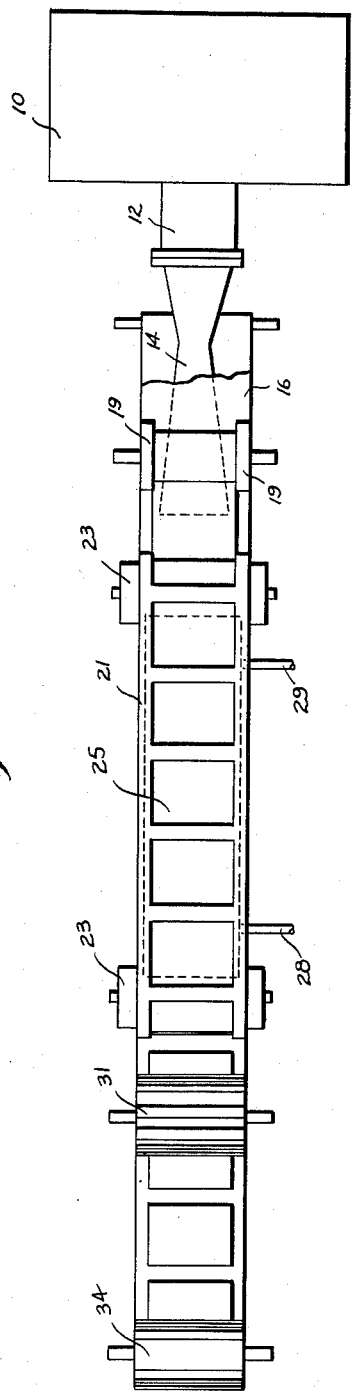
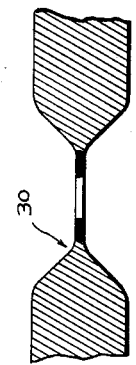
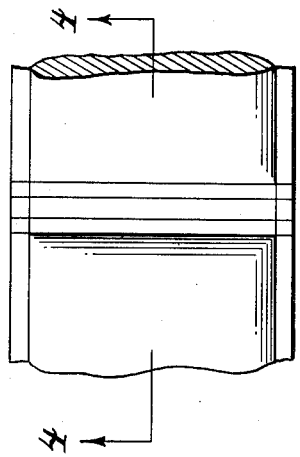
INVENTOR.
ARNOLD NORMAN NAWROCKI
BY
HIS ATTORNEY

United States Patent Office 2,759,308
Patented Aug. 21, 1956

---

2,759,308

APPARATUS FOR PRODUCING INDIVIDUALLY WRAPPED CHEESE SLABS

Arnold Norman Nawrocki, Curwensville, Pa., assignor, by mesne assignments, to Clearfield Cheese Company, Curwensville, Pa., a partnership Application October 5, 1953, Serial No. 384,234

2 Claims. (Cl. 53—122)

This invention relates to an apparatus for wrapping cheese, and particularly to an apparatus for producing individually wrapped slice-like slabs of cheese products.

At the present time, it is the common practice in the marketing of cheese for retail distribution to put up a plurality of slices in unit packages with each package containing more than a single slice of cheese. This method is not entirely satisfactory from a consumer's point of view, in that cheese slices often stick together and a consumer has considerable difficulty in trying to separate the individual slices without tearing them. In addition, once a package of that type has been opened and one or more slices has been removed therefrom, it is difficult to properly rewrap the remaining slices so as to protect them from the atmosphere which will cause the slices to dry out, harden and acquire an unattractive appearance.

With the foregoing conditions in mind, the present invention has in view as its foremost object the provision, in the production of cheese in slice form, of an apparatus which will individually wrap a slice-like slab of cheese in a transparent, pliant wrapper. This is accomplished by the use of one of that class of wrapping films which are susceptible of being sealed under heat and/or pressure, such as a laminated cellophane and polyethylene, Pliofilm, Saran or certain of the vinylchlorides.

From the point of view of providing a package that will be particularly attractive to the user, it is important that each individually wrapped slice be easily opened. Thus, another highly important object of this invention is to provide an apparatus which will produce individually wrapped slice-like slabs that can be easily opened.

A more particular object of the invention is to provide a device of the character described by means of which individual portions of cheese are formed that closely resemble conventional slices.

Various other more detailed objects and advantages of the invention, such as arise in connection with carrying out the above objectives in a practical embodiment, will in part become apparent and in part be hereinafter stated, as the description of the invention proceeds.

The invention therefore comprises an apparatus for producing individually wrapped cheese slice-like slabs which consists essentially of a hopper for supplying molten cheese food to be wrapped, support rollers for holding the wrapping film, complemental heat-sealing rollers for sealing the marginal edges of the wrapping film package, complemental endless belts for forming the individual slabs, a cooling element for substantially solidifying the molten cheese food, transverse heat-sealing elements for making a transverse seal between the individual slabs, and a cutting element for severing the wrapping film package between each slab.

For a full and more complete understanding of the invention, reference may be had to the following description and accompanying drawings wherein similar numerals refer to similar parts throughout the several views.

Figure 2 is a diagrammatical top plan view of the apparatus shown in Fig. 1.

Figure 3 is a diagrammatical top plan view of a section of the cheese package of the present invention prior to cutting into individual slice-like slabs showing the marginal edge seal and the transverse seal between the packages.

Figure 4 is an enlarged detail section of the cheese package taken about the line 4—4 of Fig. 3, indicating the transverse seal between successive slices.

Figure 1:
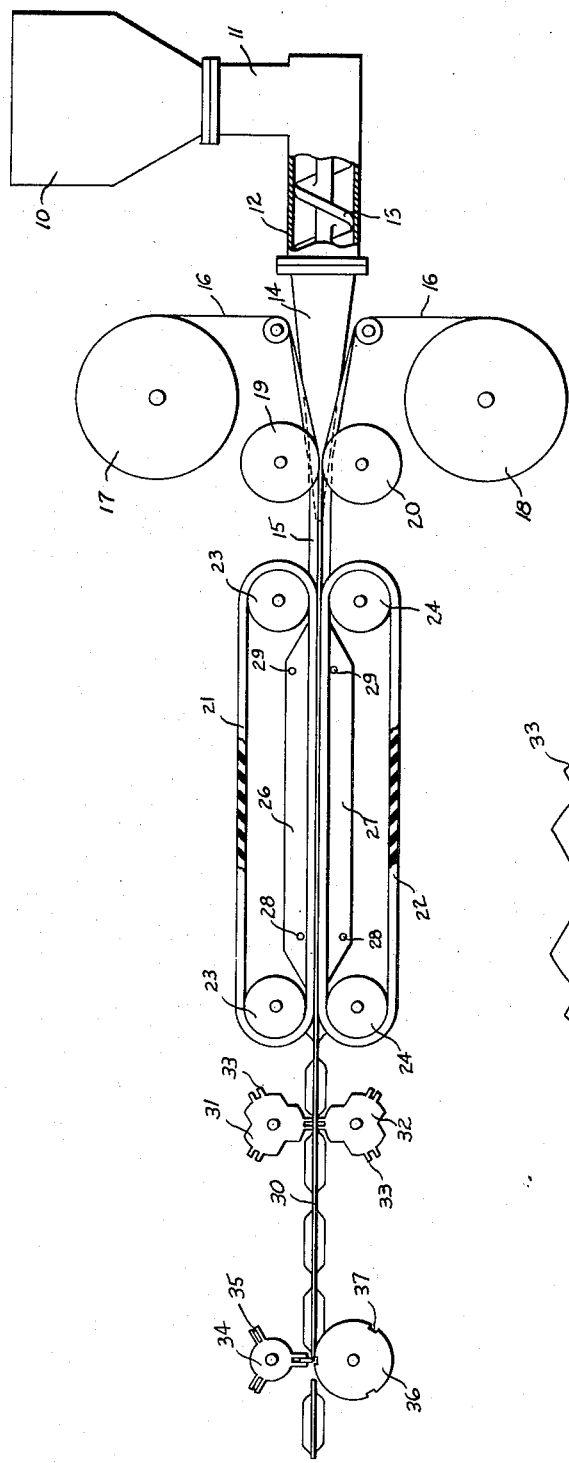
Figure 1 is a diagrammatical side elevational view, wih parts broken away and shown in section, illustrating the apparatus of the present invention.

Referring to the drawings, a hopper represented at 10 in Fig. 1 contains cheese or cheese food in a molten or fluid state, and said cheese being maintained at a preferred temperature of about 160° F. This cheese passes downwardly through a vertical conduit 11 into a horizontal conduit 12 where it engages a revolving worm 13, residing therein, which draws the molten cheese forward into a nozzle 14 connected to said horizontal conduit 12. This nozzle is substantially flat and broadens or fans-out in the direction of its orifice, as shown in dotted lines in Fig. 2. Encompassing the orifice end of the nozzle 14 in substantially tubular fashion is a transparent film forming a closed tubular package 15 for the cheese material emanating from the nozzle orifice. This package 15 is formed from two sheets of film 16 mounted on drums 17 and 18, above and below the nozzle 14 respectively. As the film 16 is fed from the drums 17 and 18, it passes between two pairs of rollers 19 and 20 lying in adjacent relationship with their peripheries making a tangential contact, the said rollers of each pair being spaced apart laterally as shown in Fig. 2, so as to contact the marginal edges of the film only. These rollers 19 and 20 are connected to a suitable heating element which heats their contacting surfaces to a temperature of about 320° F. The film 16 is made of a special material susceptible to sealing under heat and pressure, so that as the respective films pass between the heated rollers, the coaction of said heat and the pressure of the rollers making tangential surface contact causes the two films to adhere together forming an effective seal along the edges of the film in the nature of an edge seam about ¼ of an inch wide.

As the thus-sealed package passes over the nozzle orifice, it is filled with molten cheese material emanating therefrom. The filled package 15 then passes between a pair of endless belts 21 and 22, lying in substantially adjacent relationship, as shown in Fig. 1, each belt being carried by a pair of longitudinally displaced revolving drums 23 and 24. The said belts, which are preferably made from stainless steel strips with a neoprene layer cemented thereon, are provided with rectangular recesses 25 in the neoprene layer for forming the individual cheese slabs as shown in Fig. 2, and the belt-carrying drums 23 and 24 are so spaced as to cause the belts 21 and 22 to make a surface contact, thus applying a "squeezing" action on the fluid cheese material, forcing it into the rectangular recesses 25. The said belts are synchronized so that their respective apertures meet in coplanar relationship as the belts revolve, and the additive thickness of the belts provides the desired thickness of cheese slice, the belt thickness being determined accordingly. An additive neoprene belt thickness of about ³⁄₁₆ in. is preferred.

To ensure the retention of the shape of the thus formed square-shaped slabs, the said belts 21 and 22 carrying the filled package 15 pass in heat exchange relation to a water cooler consisting of an upper member 26 arranged adjacent to the lower flight of the belt 21 and a lower member 27, disposed in proximate relation to the upper flight of the belt 22. The elements 26 and 27 have opposed lateral surfaces corresponding to the width of the package, and extending longitudinally between said belt-carrying drums 23 and 24, as shown in Fig. 1. The cooling surfaces of these members 26 and 27 are spaced apart a distance substantially equivalent to the additive thickness of the belts 21 and 22. Cooling water at a preferred temperature of about 65° F. enters the cooling member 26 and 27 through ports 28, and the exhaust coolant leaves through exhaust ports 29, respectively. Thus, as the molten cheese material passes through the cooler it loses its heat, so that by the time it leaves the cooler it has become substantially solidified, wherein the individual slabs retain their square shape.

Figure 5:
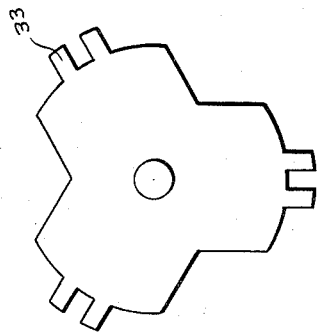
Figure 5 is an enlarged detailed view of one of the heat-sealing members for making the transverse package seal between the individual cheese slabs.

As the filled package leaves the revolving belt system, it takes on the form of a series of individual square-shaped wrapped cheese slabs having marginal sealed edges and separated by a transverse necked-down area 30 from which substantially all the cheese material has been excluded, as indicated in Figs. 3 and 4. The said package then passes between two vertically disposed complemental heat-sealing members 31 and 32 which provide a transverse seal between the cheese slices in the transverse necked-down area 30 provided therefor. The structure of these members is indicated clearly by Fig. 5. The said heat-sealing members, which lie above and below the cheese package, are each provided with three pairs of heated prongs 33, each prong being separated from its mate by about a distance of ¼ in. The prong pairs are set at an angular displacement of 120° and are synchronized so as to meet at the necked-down area 30 of the package 15 making a substantially surface contact as shown in Fig. 1. As in the case of the edge rollers 19 and 20, the said prongs are heated to 320° F., so that the combined action of the heat and the pressure of the prongs making a substantially surface contact causes the two films 16 to adhere, thus forming a transverse seal between the cheese slabs. It will be noted, however, that since the prongs 33 of each pair are separated by about ¼ in. there will be a transverse strip about ¼ in. wide which will not be sealed. This transverse seal with the centrall located unsealed strip is shown in plan view in Fig. 3, and in cross-section in Fig. 4. The purpose of this form of seal will be described below.

Having made a transverse seal between each individual cheese slab, the next and final operation is that of cutting the package 15 so as to separate the slabs into individual units. This is accomplished by passing the completely formed and sealed cheese package between the cooperating elements of a cutting member shown in Fig. 1. This cutting member consists of a rotating drum 34 having three cutting-edges 35 disposed thereabout at an angular displacement of 120° and a cooperating blade-receiving drum 36 having three blade-receiving cut-outs 37 therein similarly displaced at 120° and synchronized with the said cutting-edges 35. The said drums 34 and 36 are synchronized in their rotation so that the cutting-edges 35 and cut-outs 37 meet as the transverse sealed portion of the cheese package passes therebetween. At this point the cutting-edge 35 makes a transverse cut through the centrally located unsealed strip portion between the cheese slabs, as described above. In this manner, the individual slabs are separated into individually wrapped cheese slabs, and the marginal transverse unsealed portion, cut in the manner described above, provides a handy loose edge to grasp to open the package.

By this method of producing individually warpped cheese or cheese food slabs, it is seen that the common disadvantages of cheese slices sticking together and the attending drying-out of the cheese material once the package has been opened are eliminated.

While a preferred specific embodiment of the invention is hereinbefore set forth, it is to be clearly understood that the invention is not to be limited to the exact materials, dimensions and apparatus illustrated and described, because various modifications of these details may be provided in putting the invention into practice within the purview of the appended claims.

What is claimed is:

1. In an apparatus for producing individually wrapped slice-like slabs of cheese food, means for supplying two continuous strips of wrapping film in superimposed relationship, heat-sealing rollers in adjacent relationship adapted to seal the marginal edges of said superimposed strips to form a continuous tube, a hopper for supplying cheese food to said continuous tube, a flat nozzle associated with said hopper for delivering said cheese to said tube, a pair of complemental endless belts having rectangular recesses therein, the said belts lying in substantially adjacent relationship so as to form individual squares in said cheese-filled tube as it passes therebetween, cooling means associated with said endless belts to cool the cheese food as the said tube passes between said belts, a pair of complemental heat-sealing elements adapted to seal said tube transversely between each square, each heat-sealing element carrying three pairs of heat-sealing prongs adapted to provide a transverse seal in said tube adjacent to each square separated by an unsealed transverse strip between squares, a blade-carrying drum, and a blade-receiving drum cooperating with said blade carrying drum and adapted to cut said tube in the unsealed transverse strip between squares.

2. In an apparatus for producing individually wrapped slice-like slabs of cheese food, means for supplying two continuous strips of thermoplastic film in superimposed relationship, a plurality of pairs of rollers mounted in horizontal spaced relationship, said rollers being provided with heating means for effecting sealing of the marginal edges of the superimposed strips to form a continuous tube, a hopper for supplying cheese food to said continuous tube, a first endless belt mounted above the line of feed of the continuous tube and arranged in said line of feed, a second endless belt disposed in parallel proximate relation to said first belt below the line of feed, each of said belts comprising a plurality of rigid strips having bonded thereto a layer of resilient material, said layers being formed with a plurality of longitudinally spaced rectangular recesses, the movement of said belts being synchronized so that the respective recesses of said first belt and said second belt are in register thus forming the cheese food disposed in said tube into a plurality of spaced squares, a first cooling means disposed in adjacent relation to the lower flight of said first belt, a second cooling means disposed in adjacent relation to the upper flight of said second belt, said cooling means being operative to effect gradual congelation of the cheese food as it is formed into squares, a pair of complemental heat-sealing elements for transversely sealing said tube between each square, said heat-sealing elements including a plurality of spaced heated prongs effective to form a pair of spaced parallel sealed areas in said tube, a rotary cutting means effective upon operation to sever said tube between said sealed areas into a plurality of sections corresponding to the number of squares thus formed.

References Cited in the file of this patent

UNITED STATES PATENTS

| | | |
|---|---|---|
| 1,773,079 | Birdseye | Aug. 12, 1930 |
| 1,810,740 | Vogt | June 16, 1931 |
| 2,006,375 | Vogt | July 2, 1935 |
| 2,083,618 | Salfisberg | June 15, 1937 |
| 2,134,862 | Dunnam | Nov. 1, 1938 |
| 2,142,505 | Gammeter | Jan. 3, 1939 |
| 2,303,351 | Gage | Dec. 1, 1942 |
| 2,420,983 | Salfisberg | May 20, 1947 |
| 2,505,603 | Brandenberger | Apr. 25, 1950 |
| 2,533,554 | Byerly | Dec. 12, 1950 |
| 2,590,379 | Cloud | Mar. 25, 1952 |
| 2,613,488 | Attride | Oct. 14, 1952 |
| 2,616,232 | Meyer | Nov. 4, 1952 |
| 2,625,776 | Brandenberger | Jan. 20, 1953 |